(12) United States Patent
Teng et al.

(10) Patent No.: US 9,895,770 B2
(45) Date of Patent: Feb. 20, 2018

(54) SYSTEM FOR AUTOMATICALLY INSPECTING AND TRIMMING A PATCH ANTENNA

(71) Applicant: Cirocomm Technology Corp., Tainan (TW)

(72) Inventors: Yei-Sen Teng, Tainan (TW); Tsai-Yi Yang, Tainan (TW); Shih-Wei Chen, Tainan (TW); Fu-Sheng Chen, Tainan (TW)

(73) Assignee: CIROCOMM TECHNOLOGY CORP., Tainan (TW)

( * ) Notice: Subject to any disclaimer, the term of this patent is extended or adjusted under 35 U.S.C. 154(b) by 231 days.

(21) Appl. No.: 14/997,081

(22) Filed: Jan. 15, 2016

(65) Prior Publication Data

US 2016/0129529 A1    May 12, 2016

Related U.S. Application Data

(62) Division of application No. 13/745,138, filed on Jan. 18, 2013, now Pat. No. 9,272,381.

(30) Foreign Application Priority Data

Jan. 18, 2012    (TW) .............................. 101101923 A

(51) Int. Cl.
*B23K 26/351*    (2014.01)
*B23Q 17/20*    (2006.01)
(Continued)

(52) U.S. Cl.
CPC ............ *B23K 26/351* (2015.10); *B23K 26/36* (2013.01); *B23Q 17/20* (2013.01); *H01Q 9/0407* (2013.01);
(Continued)

(58) Field of Classification Search
CPC ...... B23Q 17/20; H01Q 9/0407; B23K 26/36; B23K 26/351; H04B 17/12; H04B 17/23; Y10T 29/54; Y10T 29/49004
(Continued)

(56) References Cited

U.S. PATENT DOCUMENTS 4,736,454 A * 4/1988 Hirsch ................... H01Q 1/247
                                                                331/107 R
4,931,799 A * 6/1990 Wen ........................ G01S 7/026
                                                                342/110
(Continued)

*Primary Examiner* — Eric Stapleton
(74) *Attorney, Agent, or Firm* — Chun-Ming Shih; HDLS IPR Services

(57) ABSTRACT

A system for automatically inspecting and trimming a ceramic patch antenna includes an inspection apparatus electrically connected to a radio frequency component testing fixture. The inspection apparatus is inputted standard parameters of electrical characteristics of the ceramic patch antenna. The ceramic patch antenna is arranged on the radio frequency component testing fixture. Then, the inspection apparatus is configured to measure electrical characteristics of the ceramic patch antenna and to judge whether the electrical characteristics of the ceramic patch antenna are the same as the standard parameters or not. The inspection apparatus is configured to drive a trimming machine for trimming a radiation metal surface of the ceramic patch antenna if the electrical characteristics of the ceramic patch antenna are different from the stand parameters.

14 Claims, 4 Drawing Sheets

(51) Int. Cl.
*H01Q 9/04* (2006.01)
*H04B 17/12* (2015.01)
*B23K 26/36* (2014.01)
*H04B 17/23* (2015.01)

(52) U.S. Cl.
CPC ............ *H04B 17/12* (2015.01); *H04B 17/23* (2015.01); *Y10T 29/49004* (2015.01); *Y10T 29/54* (2015.01)

(58) Field of Classification Search
USPC ...................................... 219/121.68; 29/284
See application file for complete search history.

(56) References Cited

U.S. PATENT DOCUMENTS

| | | | | |
|---|---|---|---|---|
| 5,181,044 A * | 1/1993 | Matsumoto | .......... | H01Q 1/3275 343/700 MS |
| 5,245,745 A * | 9/1993 | Jensen | .............. | H01Q 9/0407 29/600 |
| 5,248,947 A * | 9/1993 | Shiga | ................ | G01R 31/304 324/501 |
| 5,371,509 A * | 12/1994 | Wallace, Jr. | ........... | H01Q 1/247 343/700 MS |
| 5,572,222 A * | 11/1996 | Mailandt | ............ | H01Q 21/0075 343/700 MS |
| 5,583,523 A * | 12/1996 | Wallace, Jr. | ........... | H01Q 1/247 343/700 MS |
| 5,767,808 A * | 6/1998 | Robbins | ............... | H01Q 9/0407 343/700 MS |
| 5,913,549 A * | 6/1999 | Skladany | ................ | H01Q 1/38 29/600 |
| 5,932,119 A * | 8/1999 | Kaplan | ............... | B23K 26/032 219/121.68 |
| 6,005,519 A * | 12/1999 | Burns | ..................... | H01Q 1/38 343/700 MS |
| 6,052,087 A * | 4/2000 | Ishikawa | ............... | H01Q 13/10 333/202 |
| 6,091,355 A * | 7/2000 | Cadotte, Jr. | ............. | G01S 7/032 342/104 |
| 6,095,820 A * | 8/2000 | Luxon | ................... | H01Q 1/084 343/702 |
| 6,229,488 B1 * | 5/2001 | Lin | ........................ | H01Q 1/242 343/700 MS |
| 6,307,512 B1 * | 10/2001 | Geeraert | ............... | H01Q 1/243 343/700 MS |
| 6,462,302 B1 * | 10/2002 | Grow | ...................... | F41A 21/00 219/121.68 |
| 6,617,861 B1 * | 9/2003 | Joshi | ...................... | G01N 22/00 324/637 |
| 6,697,019 B1 * | 2/2004 | Hyuk-Joon | .......... | H01Q 1/3275 343/700 MS |
| 6,738,026 B1 * | 5/2004 | McKivergan | .......... | H01Q 1/362 343/853 |
| 6,756,936 B1 * | 6/2004 | Wu | ........................ | G01S 7/032 342/175 |
| 6,759,990 B2 * | 7/2004 | Rossman | ............... | H01Q 1/243 343/700 MS |
| 6,778,141 B1 * | 8/2004 | Yeh | ....................... | H01Q 9/045 343/700 MS |
| 6,816,128 B1 * | 11/2004 | Jennings | ................ | H01Q 1/081 343/700 MS |
| 6,879,288 B2 * | 4/2005 | Byrne | ..................... | H01Q 1/38 343/700 MS |
| 7,123,209 B1 * | 10/2006 | Desclos | ................... | H01Q 1/38 343/850 |
| 7,142,162 B2 * | 11/2006 | Taromaru | ................ | H01Q 3/44 343/702 |
| 7,239,150 B2 * | 7/2007 | Troxler | .................... | G01N 22/00 324/634 |
| 7,283,096 B2 * | 10/2007 | Geisheimer | ............ | H01Q 1/002 343/700 MS |
| 7,284,396 B2 * | 10/2007 | Barron | ................... | A44C 17/00 219/121.62 |
| 7,436,360 B2 * | 10/2008 | Chen | ........................ | H01Q 9/40 343/700 MS |
| 7,649,498 B2 * | 1/2010 | Noro | .................... | H01Q 9/0421 343/700 MS |
| 8,106,846 B2 * | 1/2012 | Kikin | ..................... | H01Q 21/24 343/797 |
| 8,618,998 B2 * | 12/2013 | Kikin | ................... | H01Q 1/2216 343/700 MS |
| 8,675,966 B2 * | 3/2014 | Tang | ...................... | G06K 9/4671 382/195 |
| 9,025,880 B2 * | 5/2015 | Perazzi | ................. | H04N 19/117 382/190 |
| 9,042,648 B2 * | 5/2015 | Wang | ....................... | G06T 7/143 382/118 |
| 2003/0058187 A1 * | 3/2003 | Billiet | .................... | H01Q 1/362 343/895 |
| 2004/0040943 A1 * | 3/2004 | Lundberg | ............... | B23K 26/10 219/121.68 |
| 2004/0108966 A1 * | 6/2004 | McKivergan | .......... | H01Q 1/362 343/895 |
| 2005/0093026 A1 * | 5/2005 | Sagae | ....................... | H01P 1/15 257/213 |
| 2006/0214851 A1 * | 9/2006 | Noro | ....................... | H01Q 9/0407 343/700 MS |
| 2007/0034613 A1 * | 2/2007 | Lundberg | ........... | B23K 26/0876 219/121.68 |
| 2007/0182626 A1 * | 8/2007 | Samavati | ................ | G01S 19/36 342/357.57 |
| 2007/0200706 A1 * | 8/2007 | Lee | ................... | G06K 19/07749 340/572.7 |
| 2008/0006615 A1 * | 1/2008 | Rosario | .................. | B23K 15/08 219/121.68 |
| 2008/0252537 A1 * | 10/2008 | Petros | .................... | H01Q 1/1285 343/713 |
| 2008/0316109 A1 * | 12/2008 | Savolainen | .......... | H01Q 1/2283 343/700 MS |
| 2009/0262024 A1 * | 10/2009 | Schillmeier | .......... | H01Q 9/0407 343/700 MS |
| 2010/0039345 A1 * | 2/2010 | Kim | ..................... | H01Q 9/0407 343/846 |
| 2010/0173237 A1 * | 7/2010 | Norimatsu | ......... | B23K 26/0626 430/30 |
| 2013/0342758 A1 * | 12/2013 | Greisen | ................. | G06T 3/0012 348/441 |
| 2014/0254922 A1 * | 9/2014 | Wang | .................... | G06K 9/4671 382/159 |

* cited by examiner

SYSTEM FOR AUTOMATICALLY INSPECTING AND TRIMMING A PATCH ANTENNA

CROSS-REFERENCE TO RELATED APPLICATION

This application is a divisional application of U.S. patent application Ser. No. 13/745,138, filed on Jan. 18, 2013, and entitled "METHOD FOR AUTOMATICALLY INSPECTING AND TRIMMING A PATCH ANTENNA", which is based on and claims priority from Taiwan Application No. 101101923, filed Jan. 18, 2012. The entire disclosures of the above applications are all incorporated herein by reference.

BACKGROUND OF THE INVENTION

Field of the Invention

The present invention relates to an antenna, and especially relates to a method and system for automatically inspecting electrical characteristics of a patch antenna and trimming the patch antenna.

Description of Related Art

A ceramic patch antenna includes a substrate. The substrate includes a radiation metal surface which is at the front side of the substrate, a grounded metal surface which is at the back side of the substrate, and a signal feed-in terminal which is through the substrate and is electrically connected to the radiation metal surface. The first job after a ceramic patch antenna has been manufactured is to inspect whether the electrical characteristics of the ceramic patch antenna are in the standard parameters or not. The inspection mentioned above is essential because different printing sizes of the radiation metal surfaces of the ceramic patch antennas will result in different electrical characteristics.

When the ceramic patch antenna is inspected, the ceramic patch antenna is electrically connected to a connector of a radio frequency component testing coaxial cable, so that the electrical characteristics of the ceramic patch antenna are inspected by a testing instrument. Then, a Smith chart of the electrical characteristics will be displayed on the testing instrument. After that, the inspector will check with eyes whether the Smith chart displayed on the testing instrument is the same as the standard parameters or not. If it is not the same, the radiation metal surface of the ceramic patch antenna will be trimmed by the inspector personally with a trimming machine. Once the Smith chart displayed on the testing instrument is the same as the standard parameters, the inspector will stop trimming the radiation metal surface of the panel ceramic antenna.

The inspector who trims the radiation metal surface needs a lot of experiences. Moreover, the manufacturing cost is high and the production capacity is low because inspecting and trimming ceramic patch antennas are relied on manpower.

SUMMARY OF THE INVENTION

In order to solve the above-mentioned problems, an object of the present invention is to provide a method and system for automatically inspecting and trimming a ceramic patch antenna. The electrical characteristics of the ceramic patch antenna will be automatically inspected and trimmed after the ceramic patch antenna has been manufactured, so that the electrical characteristics of the ceramic patch antenna is complied with the standard parameters. Therefore, the ceramic patch antennas are manufactured easier. The manpower and manufacturing cost is lower. The production capacity is higher. The electrical characteristics of the ceramic patch antennas are more accurate.

In order to achieve the object of the present invention mentioned above, the method of the present invention is configured to automatically inspect and trim a ceramic patch antenna which has a radiation metal surface. Firstly, an inspection apparatus electrically connected to a radio frequency component testing fixture is arranged. The inspection apparatus is inputted standard parameters of electrical characteristics of the ceramic patch antenna. Then, the ceramic patch antenna is arranged on the radio frequency component testing fixture. The inspection apparatus is configured to measure electrical characteristics of the ceramic patch antenna and to judge whether the electrical characteristics of the ceramic patch antenna are the same as the standard parameters or not. The inspection apparatus is configured to drive a trimming machine for trimming the radiation metal surface of the ceramic patch antenna if the electrical characteristics of the ceramic patch antenna are different from the stand parameters.

Moreover, the standard parameters of the electrical characteristics of the ceramic patch antenna are parameters of center frequency, bandwidth, and return loss. The inspection apparatus includes a micro processing unit, a memory unit, an operation interface, and a display. The display is configured to display a Smith chart and an S-parameter curve of the electrical characteristics of the ceramic patch antenna. A position of a middle break point of the Smith chart of the electrical characteristics of the ceramic patch antenna is in a range. A position of a middle break point of the standard parameters is within a lattice displayed on the display. The range is one-third wider extended from the lattice. The middle break point is limited such that a voltage standing wave ratio (VSWR) is larger than one and smaller than infinite. The radio frequency component testing fixture is a radio frequency coaxial cable connector. The radio frequency component testing fixture is electrically connected to a signal feed-in terminal of the ceramic patch antenna. The inspection is finished if the electrical characteristics of the ceramic patch antenna measured by the inspection apparatus are judged the same as the standard parameters. The inspection apparatus is configured to display an image and a location of the radiation metal surface requiring trimming when the electrical characteristics of the ceramic patch antenna are different from the standard parameters. The trimming machine is a laser engraving machine. An image capturing apparatus is configured to capture the image and the location of the radiation metal surface requiring trimming. The inspection apparatus is configured to judge whether the location of the radiation metal surface requiring trimming is correct or not. The trimming machine is calibrated if the location of the radiation metal surface requiring trimming is incorrect. Therefore, the trimming machine is configured to accurately trim the location of the radiation metal surface requiring trimming in accordance with a signal sent from the inspection apparatus. The image capturing apparatus is a Charge Coupled Device (CCD) or a Complementary Metal-Oxide Semiconductor (CMOS) camera lens. The inspection and trimming for the ceramic patch antenna is finished if the electrical characteristics of the ceramic patch antenna measured by the inspection apparatus are the same as the standard parameters.

In order to achieve the object of the present invention mentioned above, the system of the present invention is configured to automatically inspect and trim a ceramic patch antenna which has a radiation metal surface. The system includes an inspection apparatus and a trimming machine. The inspection apparatus is electrically connected to a radio frequency component testing fixture, wherein the ceramic patch antenna is arranged on the radio frequency component testing fixture. The inspection apparatus is inputted standard parameters. The trimming machine is electrically connected to the inspection apparatus. The ceramic patch antenna is arranged on the radio frequency component testing fixture. The inspection apparatus is configured to measure electrical characteristics of the ceramic patch antenna. The inspection apparatus is configured to drive a trimming machine for trimming a radiation metal surface of the ceramic patch antenna if the electrical characteristics of the ceramic patch antenna are different from the stand parameters.

The inspection apparatus includes a micro processing unit, a memory unit, an operation interface, and a display. The micro processing unit has a firmware program for inspecting the electrical characteristics of the ceramic patch antenna. The memory unit is electrically connected to the micro processing unit. The memory unit is configured to record the electrical characteristics of the ceramic patch antenna and the standard parameters.

The operation interface is electrically connected to the micro processing unit. The operation interface is adapted to receive commands and parameters. The display is electrically connected to the micro processing unit. The display is configured to display a Smith chart and an S-parameter curve measured by the micro processing unit.

A position of a middle break point of the Smith chart of the electrical characteristics of the ceramic patch antenna is in a range. A position of a middle break point of the standard parameters is within a lattice displayed on the display. The range is one-third wider extended from the lattice. The middle break point is limited such that a voltage standing wave ratio (VSWR) is larger than one and smaller than infinite.

The radio frequency component testing fixture is a radio frequency coaxial cable connector. The radio frequency component testing fixture is electrically connected to a signal feed-in terminal of the ceramic patch antenna. The standard parameters of the electrical characteristics of the ceramic patch antenna are parameters of center frequency, bandwidth, and return loss. The trimming machine is a grinding engraving machine or a laser machine. The inspection is finished if the electrical characteristics of the ceramic patch antenna measured by the inspection apparatus are the same as the standard parameters. The system further includes an image capturing apparatus electrically connected to the inspection apparatus. The image capturing apparatus is configured to capture the image and the location of the radiation metal surface requiring trimming. Therefore, the trimming machine is configured to accurately trim the radiation metal surface. The image capturing apparatus is a Charge Coupled Device (CCD) or a Complementary Metal-Oxide Semiconductor (CMOS) camera lens.

DETAILED DESCRIPTION OF THE INVENTION

Figure 1:
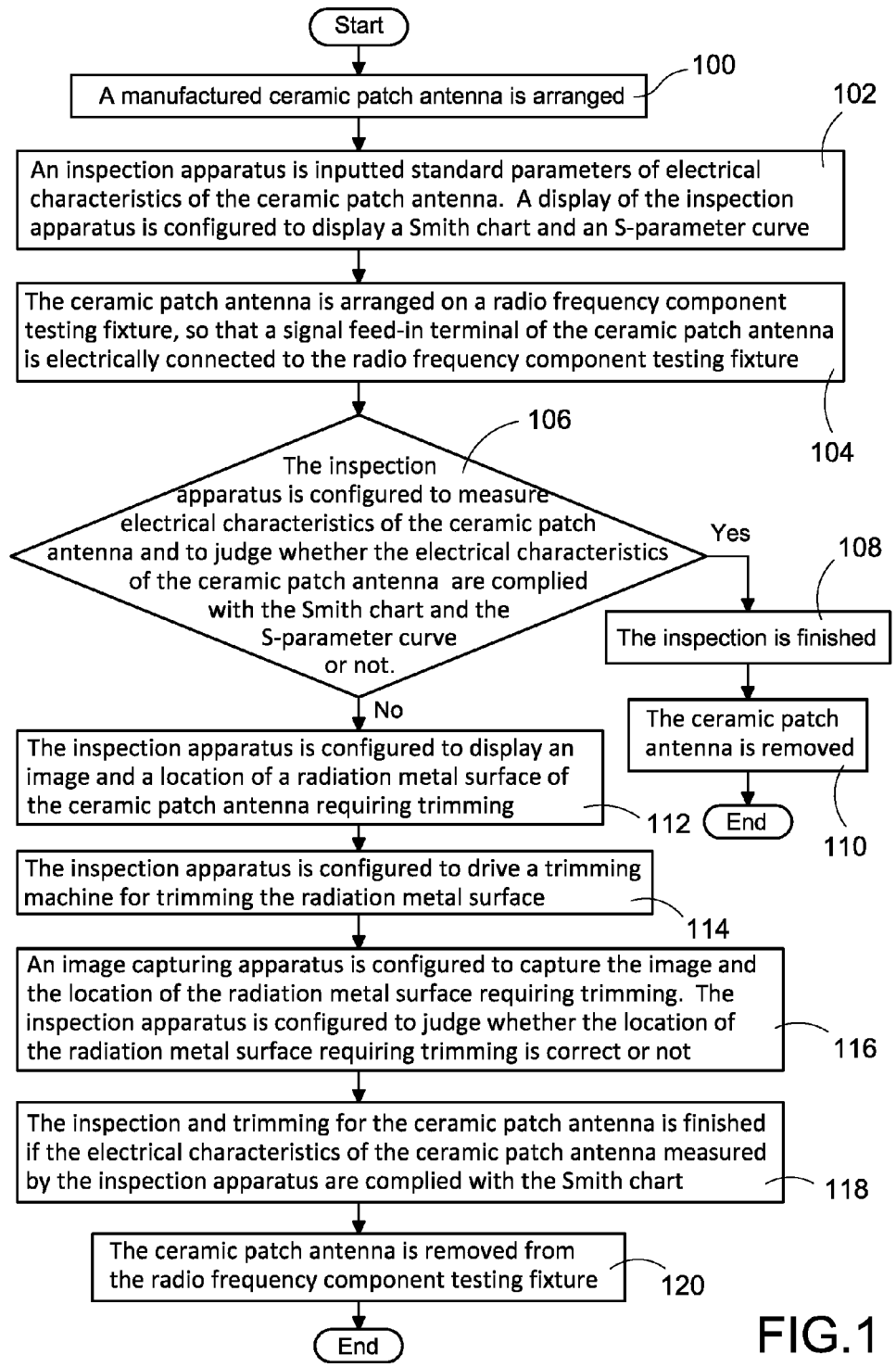
FIG. 1 shows a flow chart of the method for automatically inspecting and trimming a patch antenna of the present invention.

FIG. 1 shows a flow chart of the method for automatically inspecting and trimming a patch antenna of the present invention. Firstly, a manufactured ceramic patch antenna is arranged (step 100).

An inspection apparatus is inputted standard parameters (for examples, parameters of center frequency, bandwidth, and return loss) of electrical characteristics of the ceramic patch antenna. A display of the inspection apparatus is configured to display a Smith chart and an S-parameter curve (step 102). The inspection apparatus includes a micro processing unit, a memory unit, an operation interface, and the display.

The ceramic patch antenna is arranged on a radio frequency component testing fixture, so that a signal feed-in terminal of the ceramic patch antenna is electrically connected to the radio frequency component testing fixture (step 104). The radio frequency component testing fixture is a radio frequency coaxial cable connector electrically connected to the signal feed-in terminal of the ceramic patch antenna.

The inspection apparatus is configured to measure electrical characteristics of the ceramic patch antenna and to judge whether the electrical characteristics of the ceramic patch antenna are complied with the Smith chart and the S-parameter curve or not (step 106). If the electrical characteristics of the ceramic patch antenna are complied with the standard parameters, the inspection is finished (step 108), then the ceramic patch antenna is removed (step 110).

If the electrical characteristics of the ceramic patch antenna are not complied with the Smith chart and the S-parameter curve, the inspection apparatus is configured to display an image and a location of a radiation metal surface of the ceramic patch antenna requiring trimming (step 112).

The inspection apparatus is configured to drive a trimming machine for trimming the radiation metal surface (step 114). The trimming machine is a laser engraving machine.

An image capturing apparatus is configured to capture the image and the location of the radiation metal surface requiring trimming. The inspection apparatus is configured to judge whether the location of the radiation metal surface requiring trimming is correct or not (step 116). If the location of the radiation metal surface requiring trimming is incorrect, the trimming machine is calibrated, so that the trimming machine can accurately trim the location of the radiation metal surface. The image capturing apparatus is a Charge Coupled Device (CCD) or a Complementary Metal-Oxide Semiconductor (CMOS) camera lens.

The inspection and trimming for the ceramic patch antenna is finished if the electrical characteristics of the ceramic patch antenna measured by the inspection apparatus are complied with the Smith chart (i.e. the standard parameters) (step 118).

Finally, the ceramic patch antenna is removed from the radio frequency component testing fixture (step 120).

Figure 2:
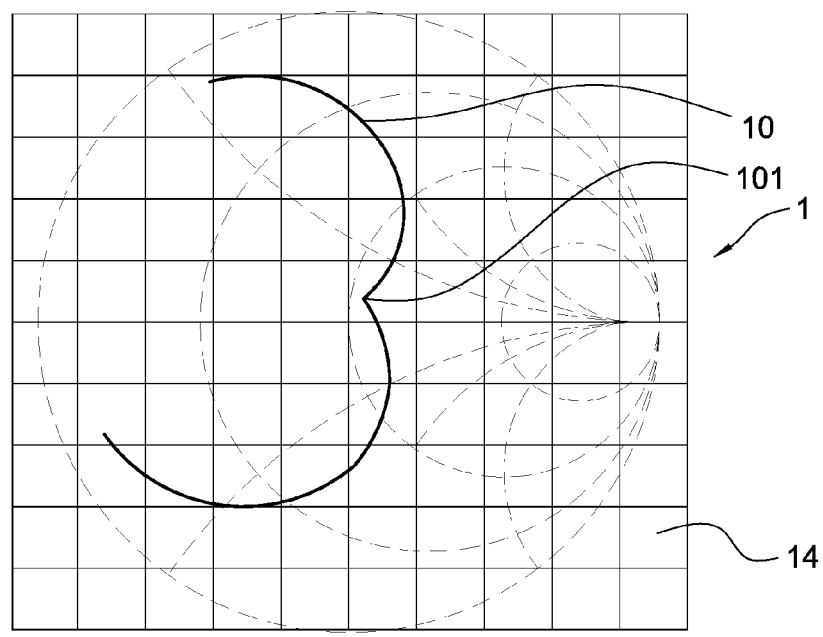
FIG. 2 shows a diagram of the Smith chart of the present invention.
Figure 3:
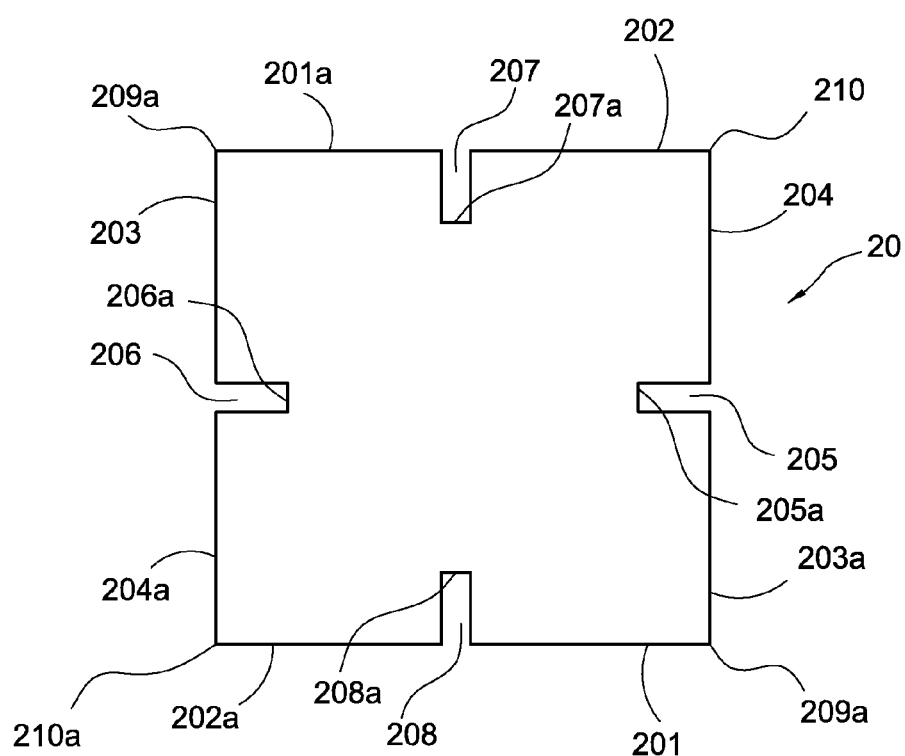
FIG. 3 shows a diagram of the radiation metal surface of the ceramic patch antenna of the present invention.

FIG. 2 shows a diagram of the Smith chart of the present invention. FIG. 3 shows a diagram of the radiation metal surface of the ceramic patch antenna of the present invention. Firstly, the inspection apparatus 1 is inputted the standard parameters of the electrical characteristics of the ceramic patch antenna. The Smith chart 10 is displayed on the display 14 of the inspection apparatus 1. A position of a middle break point 101 of the Smith chart 20 of the electrical characteristics of the ceramic patch antenna is in a range. A position of a middle break point 101 of the standard parameters is within a lattice displayed on the display 14. The range is one-third wider extended from the lattice. The middle break point 101 is limited such that a voltage standing wave ratio (VSWR) is larger than one and smaller than infinite (for example, the VSWR is smaller than 1.5 times of the radius).

Example 1: when the ceramic patch antenna is inspected, if the frequency is increasing, and the bandwidth is decreasing (or increasing), and the position of the middle break point 101 of the Smith chart 10 is moving up, a right downside 201 and a left upside 201a of the radiation metal surface 20 will be trimmed.

Example 2: when the ceramic patch antenna is inspected, if the frequency is increasing, and the bandwidth is decreasing (or increasing), and the position of the middle break point 101 of the Smith chart 10 is moving down, a right upside 202 and a left downside 202a of the radiation metal surface 20 will be trimmed.

Example 3: when the ceramic patch antenna is inspected, if the frequency is increasing, and the bandwidth is increasing (or decreasing), and the position of the middle break point 101 of the Smith chart 10 is moving up, a left side up 203 and a right side down 203a of the radiation metal surface 20 will be trimmed.

Example 4: when the ceramic patch antenna is inspected, if the frequency is increasing, and the bandwidth is increasing (or decreasing), and the position of the middle break point 101 of the Smith chart 10 is moving down, a right side up 204 and a left side down 204a of the radiation metal surface 20 will be trimmed.

Example 5: when the ceramic patch antenna is inspected, if the frequency is decreasing, and the bandwidth is increasing (or decreasing), and the position of the middle break point 101 of the Smith chart 10 is not moving, a bottom side 205a of a cave 205 of the radiation metal surface 20, and a bottom side 206a of a cave 206 of the radiation metal surface 20 will be trimmed.

Example 6: when the ceramic patch antenna is inspected, if the frequency is decreasing, and the bandwidth is decreasing (or increasing), and the position of the middle break point 101 of the Smith chart 10 is not moving, a bottom side 207a of a cave 207 of the radiation metal surface 20, and a bottom side 208a of a cave 208 of the radiation metal surface 20 will be trimmed.

Example 7: when the ceramic patch antenna is inspected, if the frequency is increasing, and the bandwidth is increasing, and the position of the middle break point 101 of the Smith chart 10 is moving up (or moving down), a corner 209 of the radiation metal surface 20, and a corner 209a of the radiation metal surface 20 will be trimmed.

Example 8: when the ceramic patch antenna is inspected, if the frequency is increasing, and the bandwidth is increasing, and the position of the middle break point 101 of the Smith chart 10 is moving up (or moving down), a corner 210 of the radiation metal surface 20, and a corner 210a of the radiation metal surface 20 will be trimmed.

Figure 4:
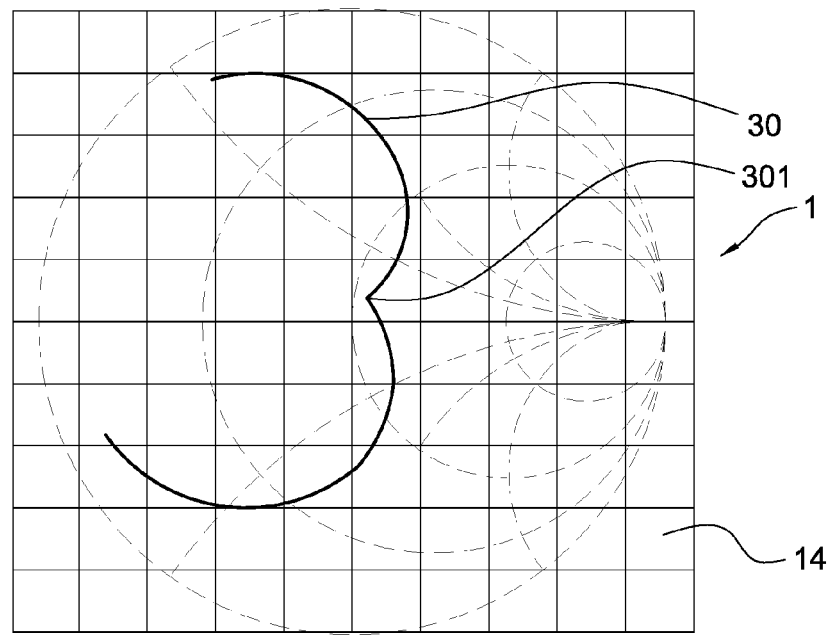
FIG. 4 shows another diagram of the Smith chart of the present invention.
Figure 5:
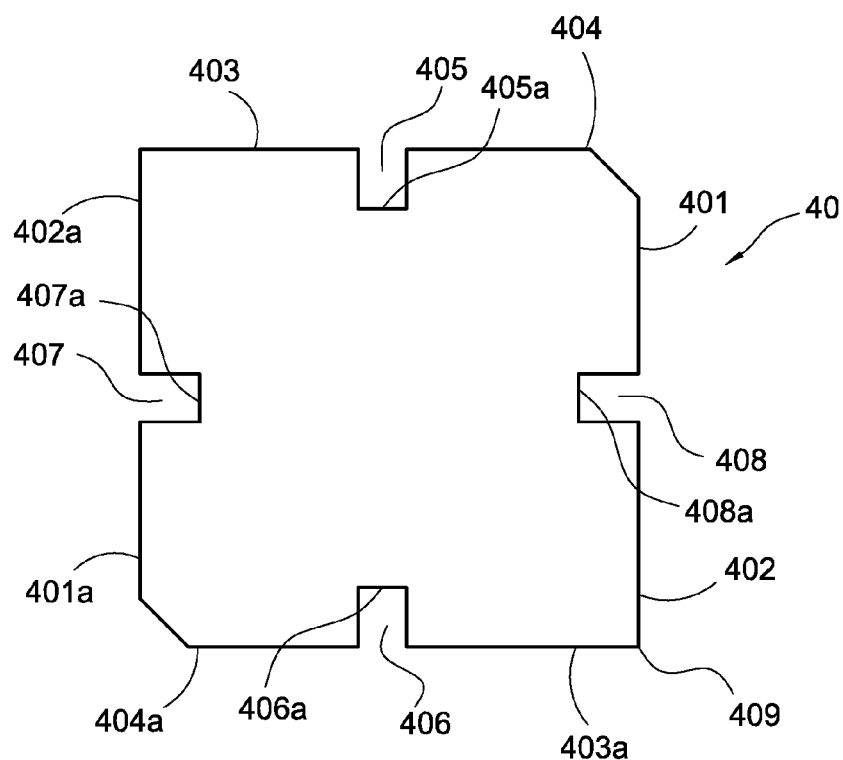
FIG. 5 shows another diagram of the radiation metal surface of the ceramic patch antenna of the present invention.

FIG. 4 shows another diagram of the Smith chart of the present invention. FIG. 5 shows another diagram of the radiation metal surface of the ceramic patch antenna of the present invention. Firstly, the inspection apparatus 1 is inputted standard parameters of the electrical characteristics of the ceramic patch antenna. The Smith chart 30 is displayed on the display 14 of the inspection apparatus 1. A position of a middle break point 301 of the Smith chart 30 of the electrical characteristics of the ceramic patch antenna is in a range. A position of a middle break point 301 of the standard parameters is within a lattice displayed on the display 14. The range is one-third wider extended from the lattice. The middle break point 301 is limited such that a voltage standing wave ratio (VSWR) is larger than one and smaller than infinite (for example, the VSWR is smaller than 1.5 times of the radius).

Example 1: when the ceramic patch antenna is inspected, if the frequency is increasing, and the bandwidth is increasing, and the position of the middle break point 301 of the Smith chart 30 is moving down, a right side up 401 and a left side down 401a of the radiation metal surface 40 will be trimmed.

Example 2: when the ceramic patch antenna is inspected, if the frequency is increasing, and the bandwidth is decreasing, and the position of the middle break point 301 of the Smith chart 30 is moving down, a right side down 402 and a left side up 402a of the radiation metal surface 40 will be trimmed.

Example 3: when the ceramic patch antenna is inspected, if the frequency is increasing, and the bandwidth is decreasing, and the position of the middle break point 301 of the Smith chart 30 is moving up, a left upside 403 and a right downside 403a of the radiation metal surface 40 will be trimmed.

Example 4: when the ceramic patch antenna is inspected, if the frequency is increasing, and the bandwidth is increasing, and the position of the middle break point 301 of the Smith chart 30 is moving up, a right upside 404 and a left downside 404a of the radiation metal surface 40 will be trimmed.

Example 5: when the ceramic patch antenna is inspected, if the frequency is decreasing, and the bandwidth is decreasing, and the position of the middle break point 301 of the Smith chart 30 is moving down, a bottom side 405a of a cave 405 of the radiation metal surface 40 and a bottom side 406a of a cave 406 of the radiation metal surface 40 will be trimmed.

Example 6: when the ceramic patch antenna is inspected, if the frequency is decreasing, and the bandwidth is increasing, and the position of the middle break point 301 of the Smith chart 30 is moving up, a bottom side 407a of a cave 407 of the radiation metal surface 40 and a bottom side 408a of a cave 408 of the radiation metal surface 40 will be trimmed.

Example 7: when the ceramic patch antenna is inspected, if the frequency is increasing, and the bandwidth is decreasing, and the position of the middle break point 301 of the Smith chart 30 is not moving, a corner 409 of the radiation metal surface 40 will be trimmed.

Figure 6:
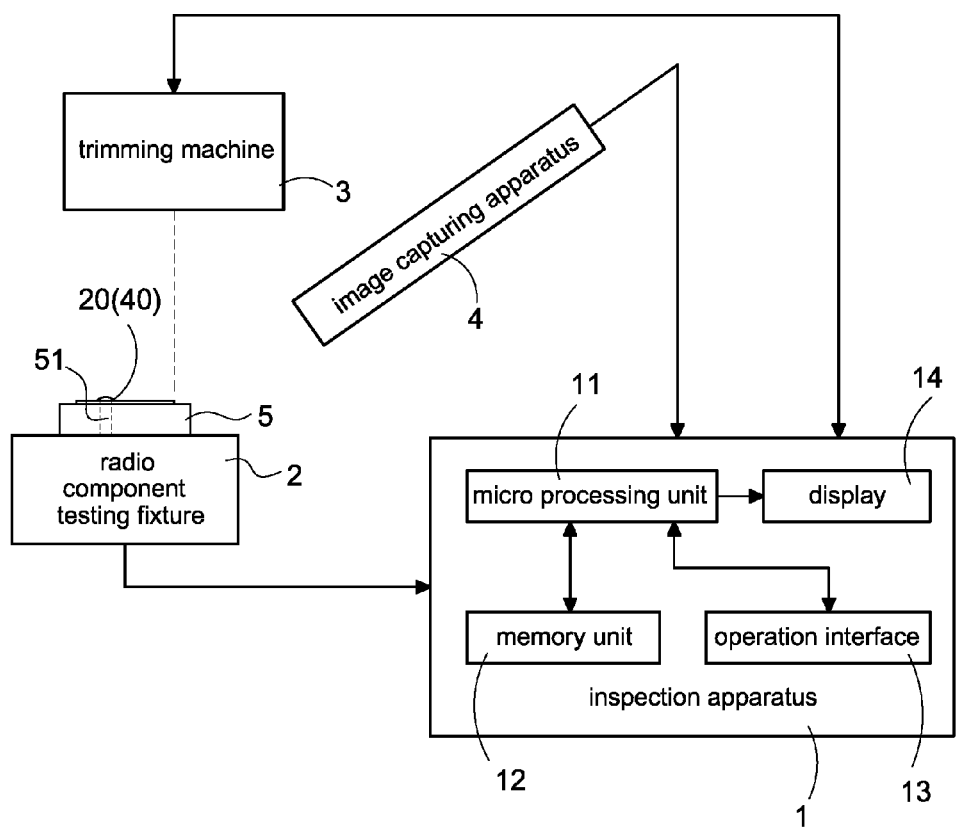
FIG. 6 shows a block diagram of the system for automatically inspecting and trimming a patch antenna of the present invention.

FIG. 6 shows a block diagram of the system for automatically inspecting and trimming a patch antenna of the present invention. The system of the present invention includes an inspection apparatus 1, a radio frequency component testing fixture 2, a trimming machine 3, and an image capturing apparatus 4.

The inspection apparatus 1 is, for example, a computer. The inspection apparatus 1 includes a micro processing unit 11, a memory unit 12, an operation interface 13, and a display 14. The micro processing unit 11 has a firmware program for inspecting electrical characteristics of a ceramic patch antenna 5. The memory unit 12 is electrically connected to the micro processing unit 11. The micro processing unit 11 is configured to record standard parameters of the electrical characteristics of the ceramic patch antenna 5 in the memory unit 12 after the standard parameters of the electrical characteristics of the ceramic patch antenna 5 are inputted into the inspection apparatus 1 through the operation interface 13.

The operation interface 13 is electrically connected to the micro processing unit 11. The operation interface 13 is adapted to receive commands and parameters. The display 14 is electrically connected to the micro processing unit 11. The display 14 is configured to display a Smith chart and an S-parameter curve measured by the micro processing unit 11. The memory unit 12 is, for example, a memory.

The radio frequency component testing fixture 2 is a radio frequency coaxial cable connector electrically connected to the inspection apparatus 1. The ceramic patch antenna 5 is electrically connected to the radio frequency component testing fixture 2. The radio frequency component testing fixture 2 is configured to send the electrical characteristics of the ceramic patch antenna 5 to the inspection apparatus 1. The inspection apparatus 1 is configured to read and judge the electrical characteristics of the ceramic patch antenna 5.

The trimming machine 3 is electrically connected to the inspection apparatus 1. The inspection apparatus 1 is configured to drive the trimming machine 3 for trimming a radiation metal surface 20(40) of the ceramic patch antenna 5 if the electrical characteristics of the ceramic patch antenna 5 requires trimming. The trimming machine 3 is a laser engraving machine.

The image capturing apparatus 4 is electrically connected to the inspection apparatus. The image capturing apparatus 4 is configured to capture the image and the location of the radiation metal surface requiring trimming. Therefore, the trimming machine 3 is configured to accurately trim the radiation metal surface 20(40) of the ceramic patch antenna 5. The image capturing apparatus 4 is, for example, a Charge Coupled Device (CCD) or a Complementary Metal-Oxide Semiconductor (CMOS) camera lens.

Firstly, the standard parameters of the electrical characteristics of the ceramic patch antenna 5 are inputted through the operation interface 13. The ceramic patch antenna 5 is arranged on the radio frequency component testing fixture 2. A signal feed-in terminal 51 of the ceramic patch antenna 5 is electrically connected to the radio frequency component testing fixture 2. The electrical characteristics of the ceramic patch antenna 5 are inputted into the inspection apparatus 1. The ceramic patch antenna 5 is removed from the radio frequency component testing fixture 2 if the electrical characteristics of the ceramic patch antenna 5 are complied with the standard parameters. The inspection apparatus 1 is configured to drive the trimming machine 3 to move above the radiation metal surface 20 (40) of the ceramic patch antenna 5. The trimming machine 3 is configured to trim the radiation metal surface 20 (40) of the ceramic patch antenna 5 in accordance with the result inspected by the inspection apparatus 1.

The image capturing apparatus 4 is configured to capture the image and the location of the radiation metal surface 20 (40) requiring trimming during the trimming process. Therefore, the trimming machine 3 is configured to accurately trim the radiation metal surface 20(40) of the ceramic patch antenna 5.

After the radiation metal surface 20(40) of the ceramic patch antenna 5 is trimmed, the inspection is finished if the electrical characteristics of the ceramic patch antenna 5 are complied with the standard parameters.

Therefore, the ceramic patch antennas 5 are manufactured easier. The manpower and manufacturing cost is lower. The production capacity is higher. The electrical characteristics of the ceramic patch antennas 5 are more accurate.

Although the present invention has been described with reference to the preferred embodiment thereof, it will be understood that the invention is not limited to the details thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A system for automatically inspecting and trimming a ceramic patch antenna having a radiation metal surface, the system including:
    an inspection apparatus electrically connected to a radio frequency component testing fixture, the ceramic patch antenna arranged on the radio frequency component testing fixture, the inspection apparatus inputted a standard parameters; and
    a trimming machine electrically connected to the inspection apparatus,
    wherein the ceramic patch antenna is arranged on the radio frequency component testing fixture; the inspection apparatus is configured to measure electrical characteristics of the ceramic patch antenna; the inspection apparatus is configured to drive the trimming machine for trimming a radiation metal surface of the ceramic patch antenna if the electrical characteristics of the ceramic patch antenna are different from the standard parameters.

2. The system in claim 1, wherein the inspection apparatus includes a micro processing unit, a memory unit, an operation interface, and a display.

3. The system in claim 2, wherein the micro processing unit has a firmware program for inspecting the electrical characteristics of the ceramic patch antenna.

4. The system in claim 3, wherein the memory unit is electrically connected to the micro processing unit; the memory unit is configured to record the electrical characteristics and the standard parameters of the ceramic patch antenna.

5. The system in claim 4, wherein the operation interface is electrically connected to the micro processing unit; the operation interface is adapted to receive inputted commands and parameters.

6. The system in claim 5, wherein the display is electrically connected to the micro processing unit; the display is configured to display a Smith chart and an S-parameter curve measured by the micro processing unit.

7. The system in claim 6, wherein a position of a middle break point of the Smith chart of the electrical characteristics of the ceramic patch antenna is within a lattice where a position of a middle break point of the standard parameters is; the middle break point is limited such that a voltage standing wave ratio is larger than one and smaller than infinite.

8. The system in claim 7, wherein the position of the middle break point of the Smith chart of the electrical characteristics of the ceramic patch antenna is in a range one-third wider extended from the lattice.

9. The system in claim 8, wherein the radio frequency component testing fixture is a radio frequency coaxial cable connector; the radio frequency component testing fixture is electrically connected to a signal feed-in terminal of the ceramic patch antenna.

10. The system in claim 9, wherein the standard parameters of the electrical characteristics of the ceramic patch antenna are parameters of center frequency, bandwidth, and return loss.

11. The system in claim 10, wherein the trimming machine is a laser engraving machine.

12. The system in claim 11, wherein the inspection is finished if the electrical characteristics of the ceramic patch antenna measured by the inspection apparatus are the same as the standard parameters.

13. The system in claim 12, further including an image capturing apparatus electrically connected to the inspection apparatus, the image capturing apparatus configured to capture the image and the location of the radiation metal surface requiring trimming, the trimming machine configured to accurately trim the radiation metal surface of the ceramic patch antenna.

14. The system in claim 13, wherein the image capturing apparatus is a charge coupled device or a complementary metal-oxide Semiconductor camera lens.

* * * * *